June 23, 1959 C. W. BAUGH, JR 2,892,018

COLOR TELEVISION RECEIVER BURST SEPARATOR

Filed Nov. 12, 1953 2 Sheets-Sheet 1

WITNESSES:

E. A. McCloskey

R. G. Brodahl

INVENTOR

Charles W. Baugh, Jr.

BY F. E. Browder

ATTORNEY

June 23, 1959 C. W. BAUGH, JR 2,892,018

COLOR TELEVISION RECEIVER BURST SEPARATOR

Filed Nov. 12, 1953 2 Sheets-Sheet 2

United States Patent Office 2,892,018

Patented June 23, 1959

2,892,018

COLOR TELEVISION RECEIVER BURST SEPARATOR

Charles W. Baugh, Jr., Princeton, N.J., assignor to Westinghouse Electric Corporation, East Pittsburgh, Pa., a corporation of Pennsylvania Application November 12, 1953, Serial No. 391,449

6 Claims. (Cl. 178—5.4)

The present invention relates to color television receiver apparatus, and more particularly to a circuit arrangement for use in such a receiver apparatus for the reception of the National Television System Committee (hereafter referred to as NTSC) color signals.

In the composite NTSC color television signal as transmitted, there is included a color synchronizing information or burst consisting of about nine cycles of the color subcarrier on the back porch following each horizontal sync pulse. The color television receiver apparatus must extract this color synchronizing information or burst from the color signal for the proper color synchronizing action within the receiver. In this respect, it is important that all of this color synchronizing information or burst be extracted from the televised signal, and further that none of the transmitted color picture information be taken with this extracted color synchronizing burst.

In accordance with known prior art color television receiver circuits for accomplishing the desired extraction of the color synchronizing burst from the composite color signal, it has been the practice to use the horizontal flyback pulse already present in the receiver, and obtainable from the horizontal output circuit thereof, for the purpose of operating a burst gate circuit which extracts this burst of color synchronizing information. However, this has been objectionable in that the horizontal flyback pulse generally occurs too early in time to properly effect the above-described extraction of the desired color synchronizing burst, and further the phase position and, accordingly, the time relationship of the horizontal flyback pulse is dependent upon the manually controllable horizontal hold control, which latter control is effective to vary the phase of the horizontal flyback pulse.

Accordingly, it is an object of the present invention to provide an improved color television receiver apparatus which is operative to effect the desired extraction of the color synchronizing information or burst from the composite televised color signal.

It is a further object of this invention to provide an improved color television receiver apparatus for operation with particularly the NTSC transmitted color signal.

It is another object of this invention to provide an improved color synchronizing operation and extraction or separation circuit for a color television receiver apparatus.

It is a different object of the present invention to provide an improved circuit for separating or extracting the color synchronizing information or burst of color subcarrier from the transmitted composite NTSC color signal.

It is a still further object of the present invention to provide an improved color synchronizing burst separation circuit which is not dependent upon the phase position of the horizontal flyback pulse, which latter phase position has the objection that it is controlled by the manually operable horizontal hold control of the receiver apparatus.

It is still another object of this invention to make unnecessary any additional phase changes of the horizontal flyback pulse for control purposes, for example, the provision of a delay line to delay the phase position of the horizontal flyback pulse as required by the prior art color television ereceiver apparatus of the type under consideration.

In accordance with the present invention, it is proposed to employ the demodulated color synchronizing burst pulse, which appears particularly in the output of the blue color difference amplifier following the blue color difference synchronous demodulator, as part of the control voltage or pulse for the gate circuit which is employed to extract or separate the color synchronizing information or burst from the televised composite NTSC color signal. This demodulated pulse of color synchronizing burst is combined with the horizontal flyback pulse such that these two pulses will overlap in time and provide a continuous gate control voltage or pulse. The amplitudes of the respective pulses are not critical since a limiter action as well known in the art can be employed to combine the pulses into effectively one continuous pulse of substantially constant amplitude.

In the output of particularly the blue color difference amplifier, which amplifier follows the blue color difference synchronous demodulator circuit, there is present a pulse which corresponds to the demodulated color synchronizing burst or information. The latter demodulated burst pulse is delayed in time relative to the color synchronizing burst by a fraction of a microsecond, which latter delay is due to the effect of the finite band width of the blue color difference signal channel. In the actual practice of the present invention, the latter fraction of a microsecond delay is advantageously employed in that the delay is enough to allow gating on a gating circuit such as an amplifier circuit during particularly the latter portion of the color synchronizing burst, and, in addition, the amount of delay is short enough that the gating circuit or amplifier is gated off prior to the time for the subsequent color video signal, which latter color video signal occurs more than one microsecond after the color synchronizing burst in the composite NTSC color signal.

Therefore, it will be seen that in accordance with the present invention, the initial portion of the control pulse or signal for the color synchronizing burst separating gate circuit is supplied by the horizontal flyback pulse and the latter portion of the control pulse or signal for the color burst gate circuit is supplied by the demodulated burst pulse above described.

The present invention, together with additional objects and advantages thereof, will best be understood from the following description, when read in connection with the accompanying drawings, in which.

Figure 1:
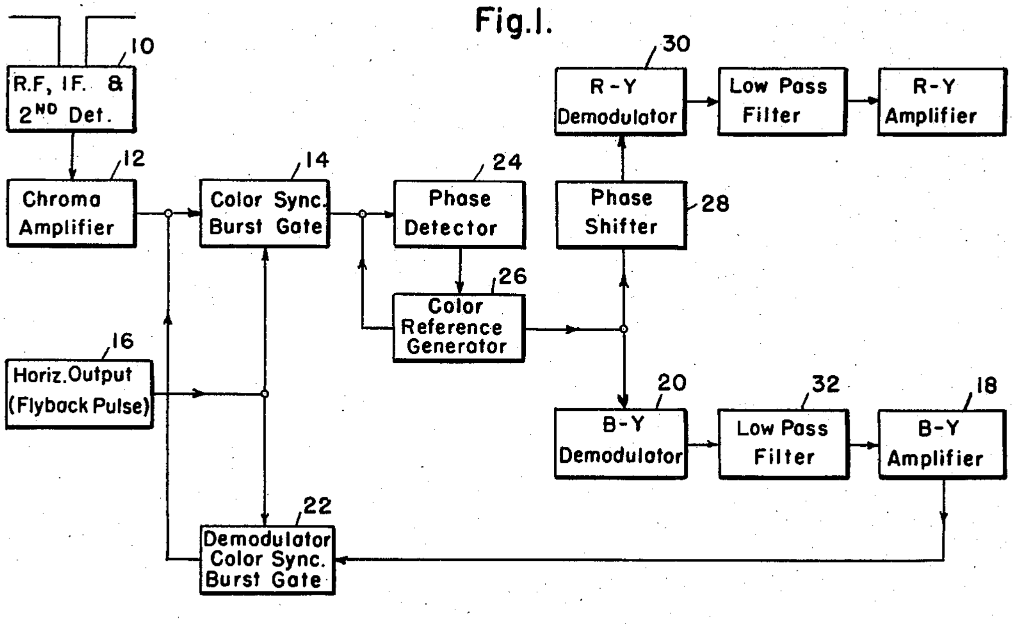
Figure 1 is a partial circuit block diagram of a color television receiver apparatus showing one embodiment of the present invention.

Referring to Fig. 1 of the drawings, the composite video signal from the second detector circuit 10 is applied to the chroma amplifier 12. The function of the chroma amplifier is to amplify the chrominance portion of the composite video signal. The output of the chroma amplifier 12 is applied to the color synchronizing burst gate or amplifier circuit 14, which latter circuit is a high gain amplifier circuit, which is normally biased to cut off and is gated on or off by the above-described combination of the horizontal flyback pulse, which is obtained from the horizontal output circuit 16 of the television receiver as is well known to those skilled in this art, and the demodulated burst pulse which is obtained from the output of the blue color difference signal amplifier 18.

For the purpose of separating the demodulated burst pulse, which pulse results from demodulating the color synchronizing burst in the blue color difference synchronous demodulator 20, there is provided a gating circuit 22 in the output circuit of the blue color difference signal amplifier 18, which latter gate circuit 22 is controlled by the broad base of the horizontal flyback pulse. A low pass filter 32 is provided between the demodulator 20 and the amplifier 18, as well known in this art. In the operation of the latter demodulated burst gate circuit 22, if the horizontal flyback pulse is too broad such that the gate circuit 22 is gated on during the time period of the initial portion of the blue color difference signal which follows the demodulated burst pulse, the phase error introduced by this initial portion of the blue color difference signal is of little consequence and, accordingly, the demodulated burst pulse gating circuit is rather discriminatory in operation. This is true in that if the polarity of the latter described initial portion of the blue color difference signal is positive as is the demodulated burst pulse, then the phase of the color subcarrier must be approximately the same as the phase of the demodulated burst pulse and, therefore, introducing this portion of the blue color difference signal into the phase detector 24 which follows the color synchronizing burst gate 14 will have a negligible effect in shifting the frequency of the controlled color reference generator 26. On the other hand, if the polarity of the above-described initial portion of the blue color difference signal is negative, then the color synchronizing burst gate circuit 14 would be gated off thereby, and hence the latter undesired negative polarity blue color difference signals would be automatically shut off from the subsequent phase detector 24, which phase detector 24 is operative to control the oscillation frequency of the color reference generator 26.

The output of the color synchronizing burst gate circuit 14 in effect contains only the separated color synchronizing burst signal. This signal is then applied to a phase detector 24, wherein it is compared with the output signal from the color reference generator 26. A voltage is developed by the phase detector 24 which is proportional to the phase difference between the color synchronizing burst signal and the output signal from the color reference generator 26. This voltage is applied to a reactance tube (not shown) in the circuit of the color reference generator 26 which reactance tube is operative to control the phase and frequency of the color reference generator 26.

The output of the color reference generator 26 is applied through a buffer stage (not shown) to directly modulate the blue color difference synchronous demodulator 20. The output of the color reference generator 26, through a buffer stage (not shown) and through a suitable circuit 28 which introduces a 90° phase shift, is applied to the red color difference synchronous demodulator 30. There can be found in the Electronics Magazine for January 1953, at pages 98 through 104, an article by Mr. Kenneth E. Farr which explains the operation of a prior art color television receiver. The output of the blue color difference signal synchronous demodulator 20 is applied through a band pass filter 32 to the blue color difference signal amplifier 18 previously described.

Figure 2:
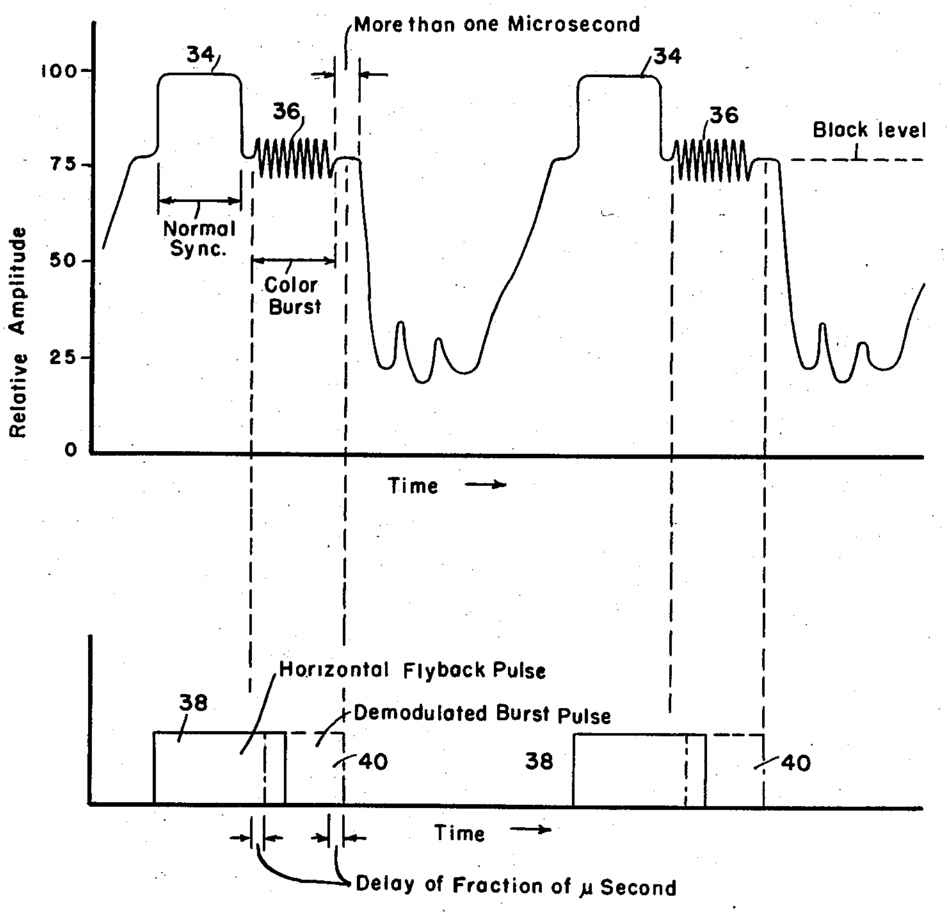
Fig. 2 is a graphical representation of a segment of the televised NTSC color signal showing the time relationship of the control pulses employed in accordance with the present invention.

In Fig. 2, there is shown a segment of the NTSC composite signal as televised and showing two horizontal sync pulses 34 with the color synchronizing information or burst 36 comprising about nine cycles of the color subcarrier on the back porch following each horizontal sync pulse 34. Also, there is shown a representative horizontal flyback pulse 38 such that the time relationship between the color synchronizing burst 36 and the horizontal flyback pulse 38 is illustrated. It is to be understood that the actual beginning and end of the horizontal flyback pulse 38 depends upon the horizontal sync circuits of the receiver. There is also shown a representation of the demodulated color burst pulse 40 in its time position relative to the color synchronizing burst 36. From the showing of Fig. 2, it will be seen that the horizontal flyback pulse 38 would be operative to gate on the color synchronizing burst gate 14 shown in Fig. 1 during the initial portion of the color synchronizing burst 36. However, the horizontal flyback pulse is shown to occur too early to satisfactorily gate on the color burst gate circuit 14 during the entire time period of the entire color synchronizing burst 36. Accordingly, the demodulated burst pulse 40 can be seen to maintain the color synchronizing burst gate 14 gated on after the termination of the horizontal flyback pulse 38 and extends the gated on time period after the termination of the color synchronizing burst 36. The latter extended time period includes the time delay introduced by the finite band width of the blue color difference signal channel, and which time delay amounts to a fraction of a microsecond which is less than the more than one microsecond time period between the termination of the color synchronizing burst 36 and the beginning of the subsequent color video information in the composite NTSC signal.

Figure 3:
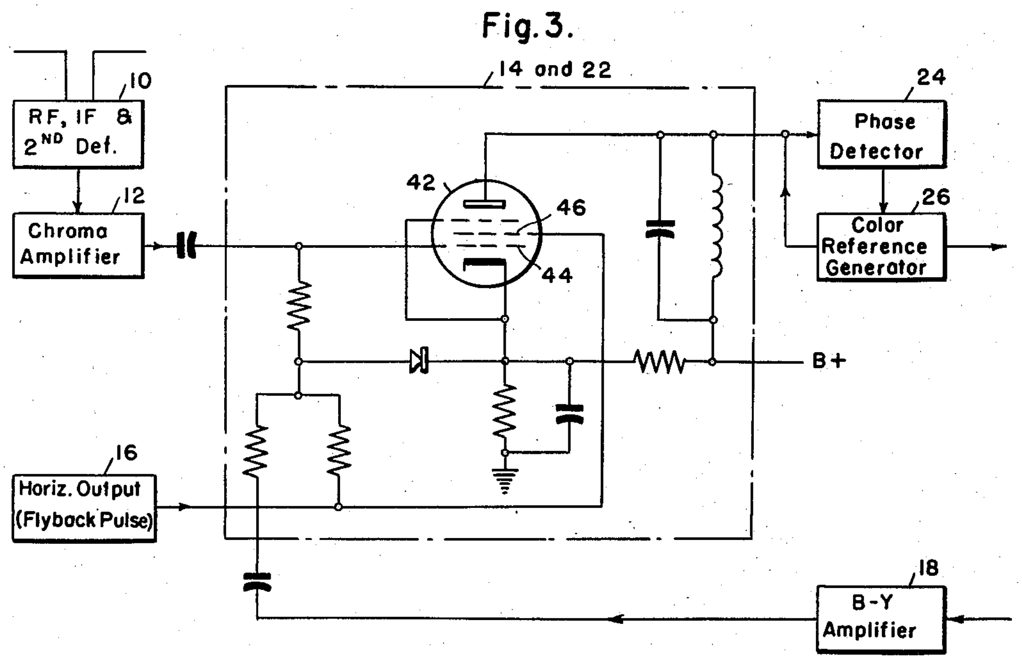
Fig. 3 is a partial schematic diagram showing one specific embodiment of the present invention.

Referring to Fig. 3 of the drawings, there is shown a specific embodiment employing the principles of the present invention and including a multielectrode discharge device 42 which corresponds to the tube of the color synchronizing burst gate circuit 14 of Fig. 1. The output of the chroma amplifier 12 is applied to the control grid 44 of the discharge device 42, which discharge device 42 is normally biased to cut off (by a suitable bias voltage source). The output of the blue color difference signal amplifier 18 is applied to the control grid 44 as is the output of the horizontal output circuit 16 which provides the horizontal flyback pulse. In accordance with the circuit arrangement shown in Fig. 3, the domodulated color synchronizing burst gate circuit 22, as shown in Fig. 1, does not comprise a separate circuit, but instead is provided by applying the horizontal flyback pulse from the horizontal output circuit 16 to the screen grid 46 of the discharge device 42. Accordingly, it will be seen that the horizontal flyback pulse on the screen grid 46 is operative to gate the demodulated burst pulse from the output of the blue color difference signal amplifier 18. The horizontal flyback pulse obtained from the horizontal output circuit 16 should have a positive polarity such that it is operative to gate on the gating circuit comprising discharge device 42 through both the control grid 44 and the screen grid 46. Similarly, the demodulated burst pulse from the output of the blue color difference signal amplifier 18 should have a positive polarity such that it is operative to gate on the discharge device 42 through the control grid 44.

While the present invention has been shown in the form of Fig. 1, wherein a separate demodulated burst pulse gate circuit was employed as the demodulated burst pulse gate circuit, and in the form of Fig. 3 wherein the color synchronizing burst gate circuit discharge device 42 was employed as the demodulated burst pulse gate circuit, it should be obvious to those skilled in the art that this invention is not so limited to these two forms but is susceptible of various other changes and modifications without departing from the spirit thereof.

I claim as my invention:

1. In a color television receiver adapted to receive a composite television signal comprising a video signal having a chrominance component, a horizontal synchronizing signal and a color synchronizing signal; circuit means for supplying such a composite television signal, means coupled to said composite signal supply circuit means responsive to said horizontal synchronizing signal to produce a horizontal flyback pulse, said horizontal flyback pulse having a time duration which includes at least a portion of said color synchronizing signal, a demodulator circuit coupled to said composite signal supply circuit means to derive said chrominance component from said video signal, said demodulator circuit including means for demodulating said color synchronizing signal to produce a control pulse having a time duration which includes at least a further portion of said color synchronizing signal, and a normally nonconductive circuit coupled to said horizontal flyback pulse producing means and to said demodulator circuit, said nonconductive circuit including means responsive to said horizontal flyback pulse and to said control pulse to render said circuit conductive during the periods of said horizontal flyback pulse and said control pulse, said normally nonconductive circuit being coupled to said composite signal supply circuit means so that said color synchronizing signal will be conducted by said normally nonconductive circuit only during the periods of conduction caused by the occurrence of said horizontal flyback pulse and said control pulse.

2. In a color television receiver adapted to receive a composite television signal comprising a video signal having a chrominance component, a horizontal synchronizing signal and a color synchronizing signal; circuit means for supplying such a composite television signal, means coupled to said composite signal supply circuit means responsive to said horizontal synchronizing signal to produce a horizontal flyback pulse, said horizontal flyback pulse having a time duration which includes at least a portion of said color synchronizing signal, a demodulator circuit coupled to said composite signal supply circuit means to derive said chrominance component from said video signal, said demodulator circuit including means for demodulating said color synchronizing signal to produce a control pulse having a time duration which includes at least a further portion of said color synchronizing signal, and a normally nonconductive circuit including an electron discharge device having at least one control electrode which is normally biased to cut off, circuit means coupled to said horizontal flyback pulse producing means and to said demodulator circuit for applying said horizontal flyback pulse and said control pulse to said control electrode so as to unbias said discharge device during the periods of said horizontal flyback pulse and said control pulse, said normally nonconductive circuit being coupled to said composite signal supply circuit means so that said color synchronizing signal will be conducted by said normally nonconductive circuit only during the periods of conduction caused by the occurrence of said horizontal flyback pulse and said control pulse.

3. In a color television receiver adapted to receive a composite television signal comprising a video signal having a chrominance component, a horizontal synchronizing signal and a color synchronizing signal; circuit means for supplying such a composite television signal, means coupled to said composite signal supply circuit means responsive to said horizontal synchronizing signal to produce a horizontal flyback pulse, said horizontal flyback pulse having a time duration which includes at least a portion of said color synchronizing signal, a demodulator circuit coupled to said composite signal supply circuit means to derive said chrominance component from said video signal, said demodulator circuit including means for demodulating said color synchronizing signal to produce a control pulse having a time duration which includes at least a further portion of said color synchronizing signal, a first normally nonconductive circuit coupled to said horizontal flyback pulse producing means and including means responsive to said horizontal flyback pulse to render said circuit conductive during the period of said horizontal flyback pulse, said first normally nonconductive circuit also coupled to said demodulator circuit so that said control pulse will be conducted by said first normally nonconductive circuit during the period of conduction caused by said horizontal flyback pulse, and a second normally nonconductive circuit coupled to said horizontal flyback pulse producing means and to said first normally nonconductive circuit, said second nonconductive circuit including means responsive to said horizontal flyback pulse and to said control pulse for rendering said second circuit conductive during the periods of said horizontal flyback pulse and said control pulse, said second normally nonconductive circuit being coupled to said composite signal supply circuit means so that said color synchronizing signal will be conducted by said second normally nonconductive circuit only during the periods of conduction caused by the occurrence of said horizontal flyback pulse and said control pulse.

4. In a color television receiver adapted to receive a composite television signal comprising a video signal having a chrominance component, a horizontal synchronizing signal and a color synchronizing signal; circuit means for supplying such a composite television signal, means coupled to said composite signal supply circuit means responsive to said horizontal synchronizing signal to produce a horizontal flyback pulse, said horizontal flyback pulse having a time duration which includes at least a portion of said color synchronizing signal, a demodulator circuit coupled to said composite signal supply circuit means to derive said chrominance component from said video signal, said demodulator circuit including means for demodulating said color synchronizing signal to produce a control pulse having a time duration which includes at least a further portion of said color synchronizing signal, a first normally nonconductive circuit including an electron discharge device having at least one control electrode which is normally biased to cut off, circuit means coupled to said horizontal flyback pulse producing means for applying said horizontal flyback pulse to said control electrode so as to unbias said discharge device during the period of said horizontal flyback pulse, said last-mentioned circuit means being further coupled to said demodulator circuit to apply said control pulse to said discharge device so that said control pulse will be conducted by said first normally nonconductive circuit during the period of conduction caused by said horizontal flyback pulse, and a second normally nonconductive circuit including an electron discharge device having at least one control electrode which is normally biased to cut off, circuit means coupled to said horizontal flyback pulse producing means and to said first normally nonconductive circuit, for applying said horizontal flyback pulse and said control pulse to said control electrode so as to unbias said discharge device during the periods of said horizontal flyback pulse and said control pulse, said second normally nonconductive circuit being coupled to said composite signal supply circuit means so that said color synchronizing signal will be conducted by said second normally nonconductive circuit only during the periods of conduction caused by the occurrence of said horizontal flyback pulse and said control pulse.

5. In a color television receiver adapted to receive a composite television signal comprising a video signal having a chrominance component, a horizontal synchronizing signal and a color synchronizing signal; circuit means for supplying such a composite television signal, means coupled to said composite signal supply circuit means responsive to said horizontal synchronizing signal to produce a horizontal flyback pulse, said horizontal flyback pulse having a time duration which includes at least a portion of said color synchronizing signal, a demodulator circuit coupled to said composite signal supply circuit means to derive said chrominance component from said video signal, said demodulator circuit including means for demodulating said color synchronizing signal to produce a control pulse substantially corresponding to the envelope of said color synchronizing signal, a normally nonconductive circuit including an electron discharge device which is normally biased to cut off, said electron discharge device having at least two grid electrodes, with one of said grid electrodes being coupled to said horizontal flyback pulse producing means so as to unbias said discharge device during the period of said flyback pulse and with the other of said grid electrodes being coupled to said demodulator circuit and to said composite signal supply circuit means to cause said electron discharge device to be conductive during the periods of said horizontal flyback pulse and said control pulse so that said color synchronizing signal will be conducted by said normally nonconductive circuit only during the periods of conduction caused by the occurrence of said horizontal flyback pulse and said control pulse.

6. In a color television receiver adapted to receive a composite television signal comprising a video signal having a chrominance component, a horizontal synchronizing signal and a color synchronizing signal; circuit means for supplying such a composite television signal, means coupled to said composite signal supply circuit means responsive to said horizontal synchronizing signal to produce a horizontal flyback pulse, said horizontal flyback pulse having a time duration which includes at least a portion of said color synchronizing signal, a color reference generator circuit for generating a color reference signal, a synchronous demodulator circuit coupled to said color reference generator circuit and to said composite signal supply circuit means to derive said chrominance component from said video signal, said demodulator circuit including means for demodulating said color synchronizing signal to produce a control pulse substantially corresponding to the envelope of said color synchronizing signal, a normally nonconductive circuit coupled to said horizontal flyback pulse producing means and to said demodulator circuit, said nonconductive circuit including means responsive to said horizontal flyback pulse and to said control pulse to render said circuit conductive during the periods of said horizontal flyback pulse and said control pulse, said normally nonconductive circuit being coupled to said composite signal supply circuit means so that said color synchronizing signal will be conducted by said normally nonconductive circuit only during the periods of conduction caused by the occurrence of said horizontal flyback pulse and said control pulse, and means coupled to said color reference generator and to said normally nonconductive circuit and responsive to said color reference signal and to said color synchronizing signal for controlling said color reference generator circuit.

References Cited in the file of this patent

UNITED STATES PATENTS

| | | |
|---|---|---|
| 2,586,957 | Keizer | Feb. 26, 1952 |
| 2,594,380 | Barton | Apr. 29, 1952 |